(12) United States Patent
Hall et al.

(10) Patent No.: US 7,098,767 B2
(45) Date of Patent: Aug. 29, 2006

(54) ELEMENT FOR USE IN AN INDUCTIVE COUPLER FOR DOWNHOLE DRILLING COMPONENTS

(75) Inventors: David R. Hall, Provo, UT (US); H. Tracy Hall, Jr., Provo, UT (US); David S. Pixton, Lehi, UT (US); Scott Dahlgren, Provo, UT (US); Joe Fox, Spanish Fork, UT (US); Cameron Sneddon, Provo, UT (US)

(73) Assignee: IntelliServ, Inc., Provo, UT (US)

( * ) Notice: Subject to any disclaimer, the term of this patent is extended or adjusted under 35 U.S.C. 154(b) by 203 days.

(21) Appl. No.: 10/708,793

(22) Filed: Mar. 25, 2004

(65) Prior Publication Data

US 2004/0164838 A1    Aug. 26, 2004

Related U.S. Application Data

(63) Continuation-in-part of application No. 10/707,234, filed on Nov. 29, 2003, now Pat. No. 6,992,554, which is a continuation-in-part of application No. 10/604,812, filed on Aug. 19, 2003, now Pat. No. 7,064,676, which is a continuation of application No. 09/816,766, filed on Mar. 23, 2001, now Pat. No. 6,670,880, which is a continuation-in-part of application No. 09/619,084, filed on Jul. 19, 2000, now abandoned.

(51) Int. Cl.
  *H01F 27/24* (2006.01)
(52) U.S. Cl. .................................... 336/234
(58) Field of Classification Search ................ 336/65, 336/83, 200, 206–208, 232, 234
  See application file for complete search history.

(56) References Cited

U.S. PATENT DOCUMENTS 749,633 A    1/1904    Seeley (Continued)

FOREIGN PATENT DOCUMENTS

EP    0399987 A1    11/1990

(Continued)

*Primary Examiner*—Tuyen T Nguyen
(74) *Attorney, Agent, or Firm*—Jeffery E. Daly; Tyson J. Wilde; Cameron Sneddon

(57) ABSTRACT

The present invention includes an element for use in an inductive coupler in a downhole component. The element includes a plurality of ductile, generally U-shaped leaves that are electrically conductive. The leaves are less than about 0.0625" thick and are separated by an electrically insulating material. These leaves are aligned so as to form a generally circular trough. The invention also includes an inductive coupler for use in downhole components, the inductive coupler including an annular housing having a recess with a magnetically conductive, electrically insulating (MCEI) element disposed in the recess. The MCEI element includes a plurality of segments where each segment further includes a plurality of ductile, generally U-shaped electrically conductive leaves. Each leaf is less than about 0.0625" thick and separated from the otherwise adjacent leaves by electrically insulating material. The segments and leaves are aligned so as to form a generally circular trough. The inductive coupler further includes an insulated conductor disposed within the generally circular trough. A polymer fills spaces between otherwise adjacent segments, the annular housing, insulated conductor, and further fills the circular trough.

11 Claims, 7 Drawing Sheets

U.S. PATENT DOCUMENTS

| | | |
|---|---|---|
| 2,178,931 A | 11/1939 | Crites et al. |
| 2,197,392 A | 4/1940 | Hawthorn |
| 2,249,769 A | 7/1941 | Leonardon |
| 2,301,783 A | 11/1942 | Lee |
| 2,354,887 A | 8/1944 | Silverman et al. |
| 2,379,800 A | 7/1945 | Hare |
| 2,414,719 A | 1/1947 | Cloud |
| 2,531,120 A | 11/1950 | Feaster |
| 2,633,414 A | 3/1953 | Boivinet |
| 2,659,773 A | 11/1953 | Barney |
| 2,662,123 A | 12/1953 | Koenig, Jr. |
| 2,748,358 A | 5/1956 | Johnston |
| 2,947,960 A * | 8/1960 | Frederickson ............... 336/212 |
| 2,974,303 A | 3/1961 | Dixon |
| 2,982,360 A | 5/1961 | Morton et al. |
| 3,079,549 A | 2/1963 | Martin |
| 3,090,031 A | 5/1963 | Lord |
| 3,170,137 A | 2/1965 | Brandt |
| 3,186,222 A | 6/1965 | Martin |
| 3,194,886 A | 7/1965 | Mason |
| 3,209,323 A | 9/1965 | Grossman, Jr. |
| 3,227,973 A | 1/1966 | Gray |
| 3,253,245 A | 5/1966 | Brandt |
| 3,518,608 A | 6/1970 | Papadopoulos |
| 3,696,332 A | 10/1972 | Dickson, Jr. et al. |
| 3,793,632 A | 2/1974 | Still |
| 3,807,502 A | 4/1974 | Heilhecker et al. |
| 3,879,097 A | 4/1975 | Oertle |
| 3,930,220 A | 12/1975 | Shawhan |
| 3,957,118 A | 5/1976 | Barry et al. |
| 3,989,330 A | 11/1976 | Cullen et al. |
| 4,012,092 A | 3/1977 | Godbey |
| 4,087,781 A | 5/1978 | Grossi et al. |
| 4,095,865 A | 6/1978 | Denison et al. |
| 4,121,193 A | 10/1978 | Denison |
| 4,126,848 A | 11/1978 | Denison |
| 4,215,426 A | 7/1980 | Klatt |
| 4,220,381 A | 9/1980 | Van der Graaf |
| 4,348,672 A | 9/1982 | Givler |
| 4,445,734 A | 5/1984 | Cunningham |
| 4,496,203 A | 1/1985 | Meadows |
| 4,537,457 A | 8/1985 | Davis, Jr. et al. |
| 4,578,675 A | 3/1986 | Macleod |
| 4,605,268 A | 8/1986 | Meador |
| 4,660,910 A | 4/1987 | Sharp et al. |
| 4,683,944 A | 8/1987 | Curlett |
| 4,698,631 A | 10/1987 | Kelly, Jr. et al. |
| 4,722,402 A | 2/1988 | Weldon |
| 4,785,247 A | 11/1988 | Meador et al. |
| 4,788,544 A | 11/1988 | Howard |
| 4,806,928 A | 2/1989 | Veneruso |
| 4,884,071 A | 11/1989 | Howard |
| 4,901,069 A | 2/1990 | Veneruso |
| 4,914,433 A | 4/1990 | Galle |
| 4,924,949 A | 5/1990 | Curlett |
| 5,008,664 A | 4/1991 | More et al. |
| 5,052,941 A | 10/1991 | Hernandez-Marti et al. |
| 5,148,408 A | 9/1992 | Matthews |
| 5,248,857 A | 9/1993 | Ollivier |
| 5,278,550 A | 1/1994 | Rhein-Knudsen et al. |
| 5,302,138 A | 4/1994 | Shields |
| 5,311,661 A | 5/1994 | Zifferer |
| 5,332,049 A | 7/1994 | Tew |
| 5,334,801 A | 8/1994 | Mohn |
| 5,371,496 A | 12/1994 | Tanamachi |
| 5,454,605 A | 10/1995 | Mott |
| 5,455,573 A | 10/1995 | Delatorre |
| 5,505,502 A | 4/1996 | Smith et al. |
| 5,517,843 A | 5/1996 | Winship |
| 5,521,592 A | 5/1996 | Veneruso |
| 5,568,448 A | 10/1996 | Tanigushi et al. |
| 5,650,983 A | 7/1997 | Kondo et al. |
| 5,691,712 A | 11/1997 | Meek et al. |
| 5,743,301 A | 4/1998 | Winship |
| RE35,790 E | 5/1998 | Pustanyk et al. |
| 5,810,401 A | 9/1998 | Mosing et al. |
| 5,833,490 A | 11/1998 | Bouldin |
| 5,853,199 A | 12/1998 | Wilson |
| 5,856,710 A | 1/1999 | Baughman et al. |
| 5,898,408 A | 4/1999 | Du |
| 5,908,212 A | 6/1999 | Smith et al. |
| 5,924,499 A | 7/1999 | Birchak et al. |
| 5,942,990 A | 8/1999 | Smith et al. |
| 5,955,966 A | 9/1999 | Jeffryes et al. |
| 5,959,547 A | 9/1999 | Tubel et al. |
| 5,971,072 A | 10/1999 | Huber et al. |
| 6,030,004 A | 2/2000 | Schock et al. |
| 6,041,872 A | 3/2000 | Holcomb |
| 6,045,165 A | 4/2000 | Sugino et al. |
| 6,046,685 A | 4/2000 | Tubel |
| 6,057,784 A | 5/2000 | Schaaf et al. |
| 6,104,707 A | 8/2000 | Abraham |
| 6,108,268 A | 8/2000 | Moss |
| 6,123,561 A | 9/2000 | Turner et al. |
| 6,141,763 A | 10/2000 | Smith et al. |
| 6,173,334 B1 | 1/2001 | Matsuzaki et al. |
| 6,177,882 B1 | 1/2001 | Ringgenberg et al. |
| 6,188,223 B1 | 2/2001 | van Steenwyk et al. |
| 6,196,335 B1 | 3/2001 | Rodney |
| 6,209,632 B1 | 4/2001 | Holbert et al. |
| 6,223,826 B1 | 5/2001 | Chau et al. |
| 6,367,565 B1 | 4/2002 | Hall |
| 6,392,317 B1 | 5/2002 | Hall et al. |
| 6,405,795 B1 | 6/2002 | Holbert et al. |
| 6,641,434 B1 | 11/2003 | Boyle et al. |
| 6,655,464 B1 | 12/2003 | Chau et al. |
| 6,670,880 B1 | 12/2003 | Hall et al. |
| 2002/135179 A1 | 9/2002 | Boyle et al. |
| 2002/0193004 A1 | 12/2002 | Boyle et al. |
| 2003/0070842 A1 | 4/2003 | Bailey et al. |
| 2003/0213598 A1 | 11/2003 | Hughes |

FOREIGN PATENT DOCUMENTS

| | | |
|---|---|---|
| WO | W8801096 | 2/1988 |
| WO | WO9014497 | 11/1990 |

* cited by examiner

ELEMENT FOR USE IN AN INDUCTIVE COUPLER FOR DOWNHOLE DRILLING COMPONENTS

CROSS REFERENCE TO RELATED APPLICATIONS

The present application is a continuation-in-part of U.S. patent application Ser. No. 10/707,234 filed on Nov. 29, 2003 now U.S. Pat. No. 6,992,554 which is a continuation-in-part of U.S. patent application Ser. No. 10/604,812 filed on Aug. 19, 2003, now U.S. Pat. No. 7,064,676 which application is, in turn, a continuation of U.S. patent application Ser. No. 09/816,766 filed on Mar. 23, 2001, now U.S. Pat. No. 6,670,880, issued Dec. 30, 2003, which is, in turn, a continuation-in-part of U.S. patent application Ser. No. 09/619,084, filed Jul. 19, 2000, now abandoned. The entire disclosures of all of these related applications are incorporated herein by reference.

FEDERAL RESEARCH STATEMENT

This invention was made with government support under Contract No. DE-FC26-01NT41229 awarded by the U.S. Department of Energy. The government has certain rights in the invention.

BACKGROUND OF INVENTION

This invention relates to oil and gas drilling and production, and more particularly to apparatus and methods for reliably transmitting information between downhole components.

For the past several decades, engineers have worked to develop apparatus and methods to effectively transmit information from components located downhole on oil and gas drilling strings to the ground''s surface. Part of the difficulty comes from the fact that the operating environment for the transmission system can be extremely harsh, including temperatures as high as 200° C., pressures as high as 25,000 psi, and extremely abrasive and chemically corrosive conditions.

Another source of difficulty comes from the fact that a drill string is made up of hundreds of components, such as sections of drill pipe and various downhole tools. Thus, if the transmission system is integrated into each of these components, it must be capable of connections that can reliably transmit information across the joints between these hundreds of components.

Moreover, since these components are connected serially to create the drill string that may stretch for thousands of feet below the earth''s surface, reliability is imperative. A failure in the transmission system of a single component can bring the whole system down and require an expensive "roundtrip" of the drill string to replace the defective component.

As an alternative to integrating a system into each of the drilling components, a transmission system has been developed known as mud pulse telemetry. Rather than using electrical connections, mud pulse telemetry transmits information in the form of pressure pulses through fluids circulating through a well bore. However, data rates of mud pulse telemetry are very slow compared to data rates needed to provide real-time data from downhole components. For example, mud pulse telemetry systems often operate at data rates less than 10 bits per second. At this rate, the low data resolution can prevent a driller from making decisions in real time. Since drilling equipment is often rented and very expensive, even slight mistakes can incur substantial expense. Part of the expense can be attributed to time-consuming operations that are required to retrieve downhole data or to verify low-resolution data transmitted to the surface by mud pulse telemetry. Often, drilling or other procedures are halted while data is gathered.

Since direct electrical connections between drill string components may be impractical and unreliable, converting electrical signals to magnetic fields for conversion back to electrical signals offers one solution for transmitting information between drill string components. One such system is disclosed in U.S. Pat. No. 6,670,880. These types of elements are referred to as inductive couplers. An inductive coupler functions by converting electrical signals to magnetic fields for transmission across the tool joint. A corresponding inductive coupler located on the next downhole component converts the magnetic field back to an electrical signal where it may be transmitted along the drill string.

Moreover, the harsh working environment of drill string components may cause damage to data transmission elements whatever their form. For example drill strings undergo intense vibrations during operation which could fracture key components in an inductive coupler and significantly weaken the transmitted signal or even render it inoperative. Another barrier to successful data transmission is the high temperatures of some boreholes. Often the boreholes extend tens of thousands of feet deep into the earth where temperatures are exceedingly hot. Sometimes they can be as high as 250 C. in the oil and gas industry and over 300 C. in geothermal wells. Inductive couplers exposed to such temperature extremes can lose their magnetic capabilities resulting in increased attenuation or even signal loss.

SUMMARY OF INVENTION

The present invention includes an element for use in an inductive coupler in a downhole component. The element includes a plurality of ductile, generally U-shaped leaves that are electrically conductive. The leaves are less than about 0.0625" thick and are separated by an electrically insulating material. These leaves are aligned so as to form a generally circular trough. The invention also includes an inductive coupler for use in downhole components, the inductive coupler including an annular housing having a recess with a magnetically conductive, electrically insulating or MCEI, element disposed in the recess. The MCEI element includes a plurality of segments where each segment further includes a plurality of ductile, generally U-shaped electrically conductive leaves. Each leaf is less than about 0.0625" thick and separated from the otherwise adjacent leaves by electrically insulating material. The segments and leaves are aligned so as to form a generally circular trough. The inductive coupler further includes an insulated conductor disposed within the generally circular trough. A polymer fills spaces between otherwise adjacent segments, the annular housing, insulated conductor, and further fills the circular trough.

In operation, a varying current applied to an insulated conductor in an inductive coupler in one downhole component generates a varying magnetic field in the magnetically conductive, electrically insulating element, which varying magnetic field is conducted to and thereby produces a varying magnetic field in a second magnetically conductive, electrically insulating element of a connected component, which magnetic field thereby generates a varying electrical current in the second insulated conductor in a second inductive coupler in the connected component. The electrical current is then transmitted along the downhole component to another inductive coupler located at the opposite end of the downhole component.

It should be noted that although the term electrical signal or current is used throughout the discussion of the invention, those terms do not only denote an electrical signal carrying information but include power transmission as well. In one embodiment of the present invention power transmission is facilitated by selecting the appropriate magnetic permeabilities and frequencies.

It should be noted that, as used herein, the term "downhole" is intended to have a relatively broad meaning, including such environments as exploratory drilling for oil, gas and geothermal energy, as well as the systems of casings and other equipment used in oil, gas and geothermal production.

It should also be noted that the term "transmission" as used in connection with the phrase "data transmission" or the like, is intended to have a relatively broad meaning, referring to the passage of signals in at least one direction from one point to another.

It should further be noted that the term "magnetically conductive" refers to a material having a magnetic permeability greater than that of air.

It should further be noted that the term "electrically insulating" means having a high electrical resistivity, preferably greater than that of steel.

It should be noted that the term "electrically conductive" means having an electrical conductivity preferably greater than that of $10^{-10}$ $(\Omega\text{-m})^{-1}$ it should be noted that the term "U-shaped" is intended to have a relatively broad meaning. When used in connection with the element, an MCEI element, or segments it means that each element or segment has a bottom portion, and two side portions with a trough formed therebetween. Consequently, the cross-section and end view appear generally U-shaped.

It should further be noted that the term "ductile" means a material that can undergo appreciable plastic deformation before fracture. The measure of a material's ductility is often expressed as percent elongation (% EL) or percent area reduction (% AR) from a tensile test.

By "mating surface," it is meant a surface on a downhole component intended to contact or nearly contact the surface of another downhole component, such as another section of drill pipe. For example, a mating surface can include threaded regions of a box end or pin end of drill pipe, primary or secondary shoulders designed to come into contact with one another, or other surfaces of downhole components that are intended to contact or come into close proximity to surfaces of other downhole components.

BRIEF DESCRIPTION OF DRAWINGS

The foregoing and other features of the present invention will become more fully apparent from the following description, taken in conjunction with the accompanying drawings. The invention will be described with additional specificity and detail through the use of the accompanying drawings with the understanding that these drawings depict only typical embodiments in accordance with the invention and are therefore not to be considered limiting in scope.

DETAILED DESCRIPTION

It will be readily understood that the components of the present invention, as generally described and illustrated in the Figures herein, may be arranged and designed in a wide variety of different configurations. Thus, the following detailed description of embodiments of the present invention, as represented in the figures, is not intended to limit the scope of the invention, but is merely representative of various selected embodiments of the invention. The embodiments of the invention will be best understood by reference to the drawings wherein like parts are designated by like numerals throughout.

An apparatus is disclosed in one embodiment of the present invention as including an inductive coupler mountable proximate a mating surface of a downhole drilling component, such as a section of drill pipe.

Figure 1:
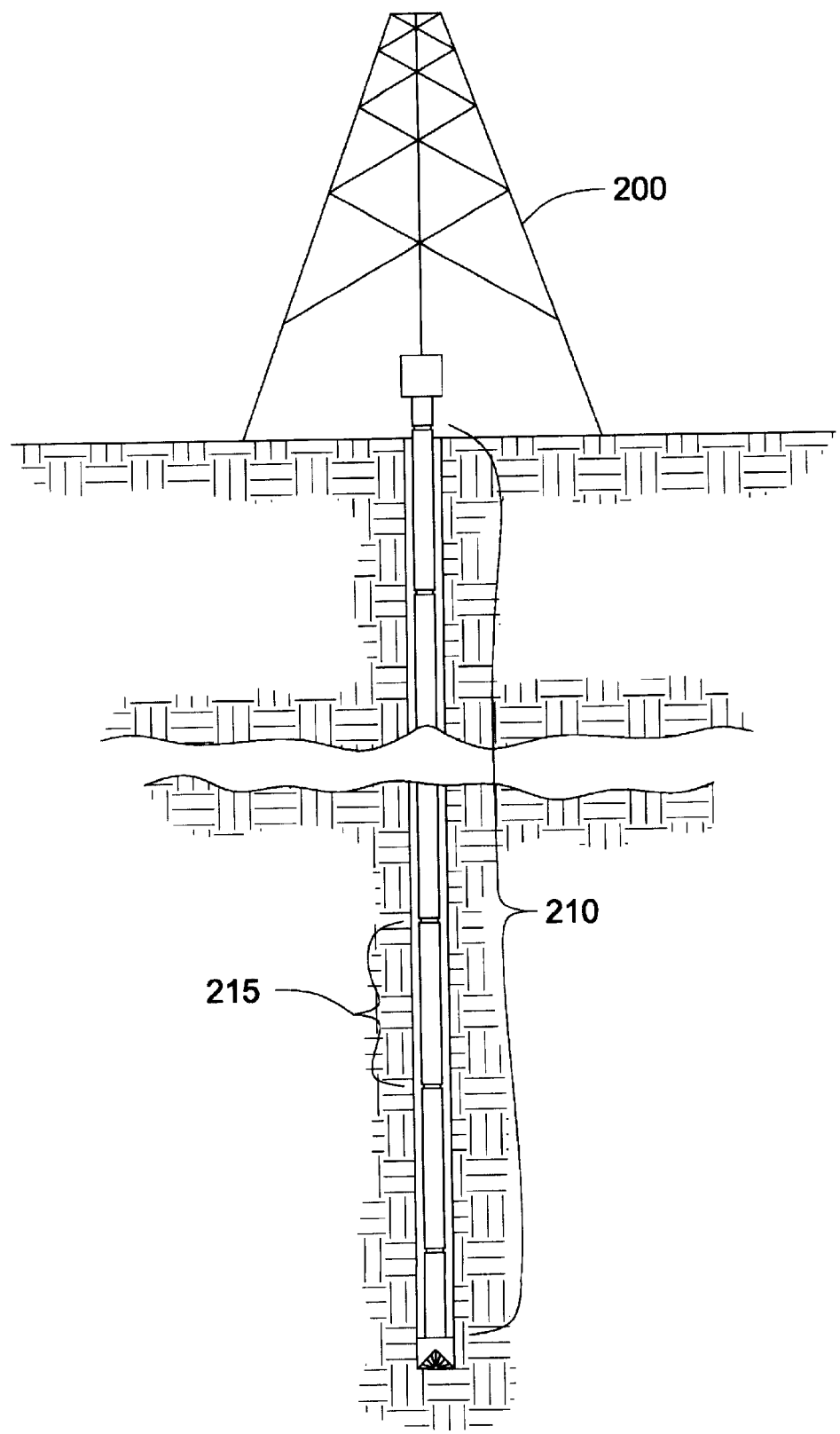
FIG. 1 is a schematic representation of a drill string as used on a drilling rig.

Referring to the drawings, FIG. 1 is a schematic representation of a drill string 210 in a borehole as used on a drilling rig 200 including downhole components such as drill pipe 215. Some examples of downhole components are drill collars, jars, heavy weight drill pipe, drill bits, and of course drill pipe.

Figure 2:
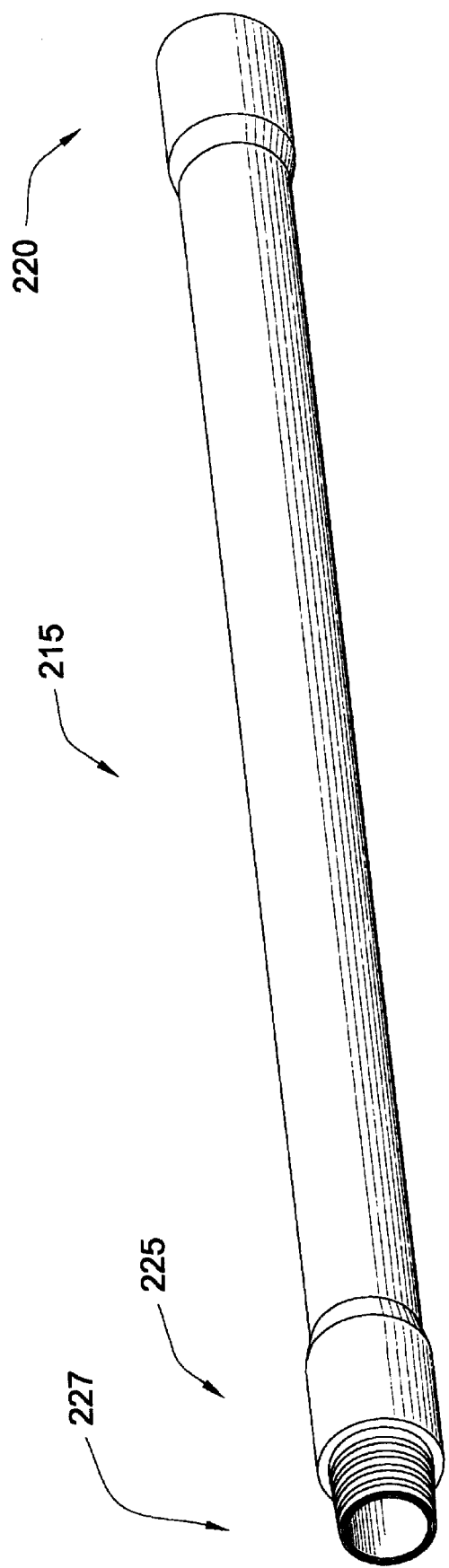
FIG. 2 is a perspective view of a drill pipe.

FIG. 2 shows one example of a downhole component, a drill pipe 215 including a box end tool joint 220, and pin end tool joint 225 and pin nose 227. Between the pin end 225 and box end 220 is the body of the drill pipe section. A typical length of the body is between 10 and 90 feet and usually about 30 feet. Drill strings in oil and gas production and exploration can extend as long as 20,000 feet, which means that as many as 700 sections of drill pipe and downhole components can be used in the drill string.

Figure 3:
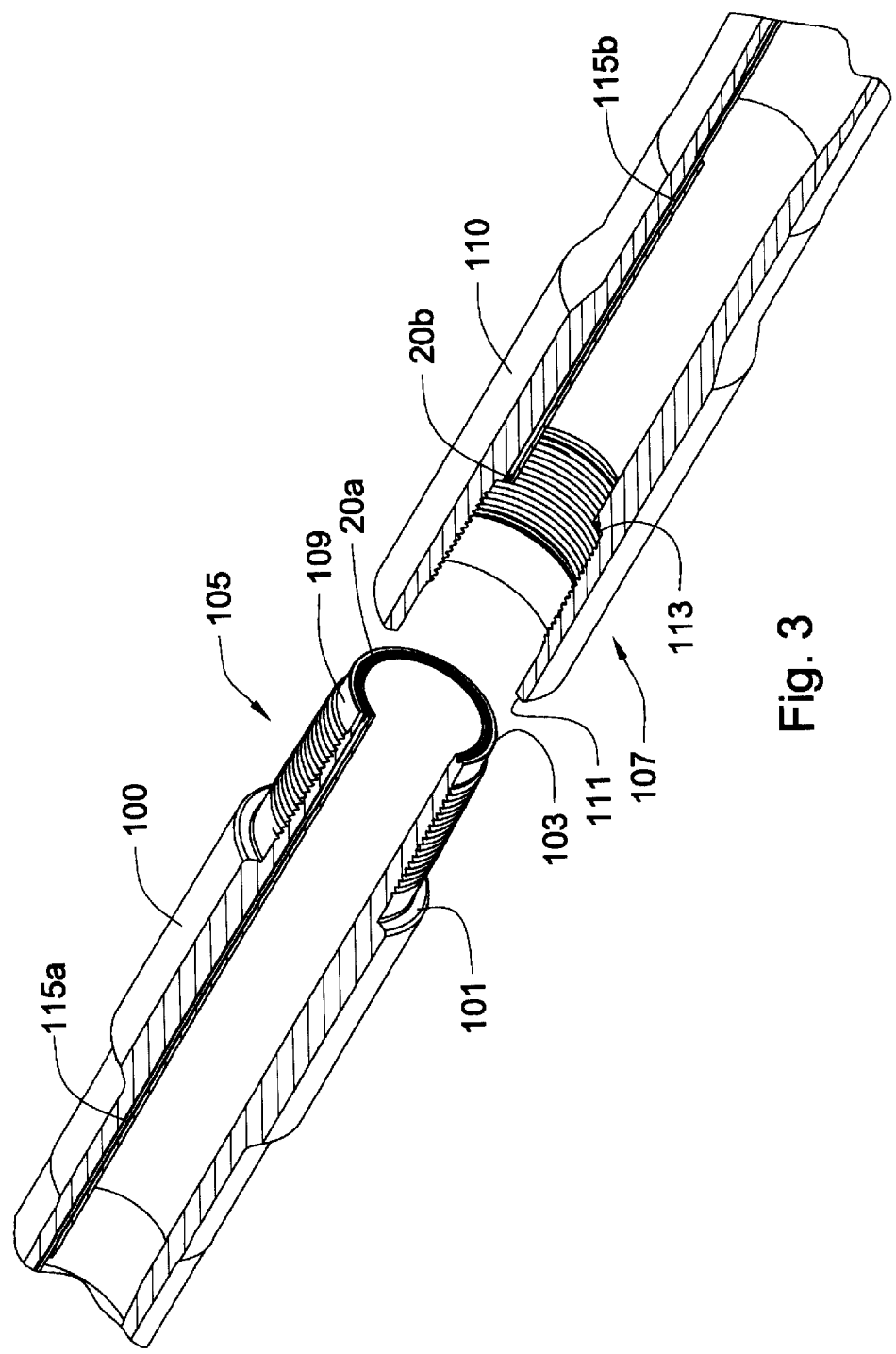
FIG. 3 is a perspective view of a partial cut away of a box and pin end tool joint illustrating the inductive coupler retained within the tool joints.

Turning to FIG. 3, a perspective view is shown of a partial cut away of a box and pin end tool joint illustrating the inductive coupler retained within the tool joints. Drill pipes 100 and 110 include a pin end 105, pin nose 109 and a box end 107 to connect drill pipes 100 and 110 together. Tool joints are attached to the component and provide threads or other devices for attaching the tools together, and to allow a high torque to be applied to resist the forces present when making up a drill string or during drilling. Between the pin end and box end of each pipe is the body of the drill pipe section (not shown).

When threading a pin end 105 into a corresponding box end 107, various shoulders may engage one another to provide structural support to components connected in a drill string. For example, a pin end 105 may include a primary shoulder 101 and a secondary shoulder 103. Likewise, the box end 107 may include a corresponding primary shoulder 111 and secondary shoulder 113. Primary shoulders 101 and 111 are typically labeled as such to indicate that the primary shoulders provide the majority of the structural support to a drill pipe 100 and 110 when torqued together. Often however, a secondary shoulder 103 located at the end of pin nose 109 also engages a corresponding secondary shoulder 113 in the box end 107, providing additional support and strength to drill pipes 100 and 110 connected in series. A drilling component exhibiting both a primary and secondary shoulder is typically referred to as double shouldered. At present, the most preferred design to use with the present invention is that which is described in U.S. Pat. No. 5,908,212 to Grant Prideco, Inc. of Woodlands, Tex., the entire disclosure of which is incorporated herein by reference.

Referring to FIG. 3 an inductive coupler 20a is mounted proximate the mating surface or shoulder 103 on a pin end 105 to communicate information to another inductive coupler 20b located on a mating surface or shoulder 113 of the box end 107. Coaxial cables 115a and 115b or other suitable transmission medium, are connected to the inductive couplers 20a and 20b respectively to transmit information therefrom along drill pipes 100 and 110. In a preferred embodiment the drill pipe will include tool joints as depicted in FIG. 3 however, a drill pipe without a tool joint can also be modified to house the coaxial cable and inductive coupler; thus tool joints are not necessary for the invention. The coaxial cable and inductive coupler could be disposed in other downhole components such as drill collars, jars, and similar components that would be typically found in a drill string. Additionally, the coaxial cable and inductive coupler could be disposed within other downhole components used in oil and gas or geothermal exploration through which it would be advantageous to transmit information and thus necessitate an inductive coupler.

Figure 4:
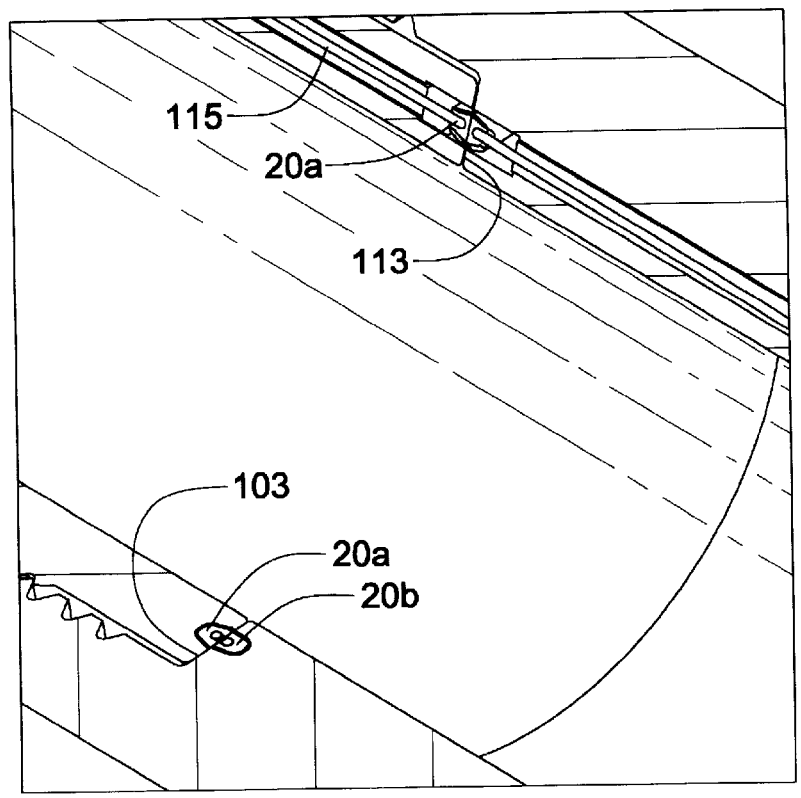
FIG. 4 is a perspective view of a partial cut away of a box and pin end connected together showing the placement of the inductive couplers in each end.

FIG. 4 is a perspective view of a partial cut away of a box and pin end connected together showing the placement of the inductive couplers in each end to transmit and receive information along a drill string. As the tool joints of each pipe are torqued together during drill string make up, each inductive coupler 20a and 20b come together and typically touch each other on their face when the secondary shoulders or mating surfaces 103 and 113 touch or almost touch. Essentially the mirror image of each inductive coupler is brought together which will be readily seen in FIG. 5. Although in ideal circumstances the inductive couplers 20a, 20b will touch when the tool joints are torqued together, there can be a relatively small gap sometimes between them caused by pipe machining tolerances and other similar manufacturing issues. The coaxial cable 115a is extending away from the inductive coupler 20a with the corresponding coaxial cable doing the same though it is just outside the frame of the drawing.

Figure 5:
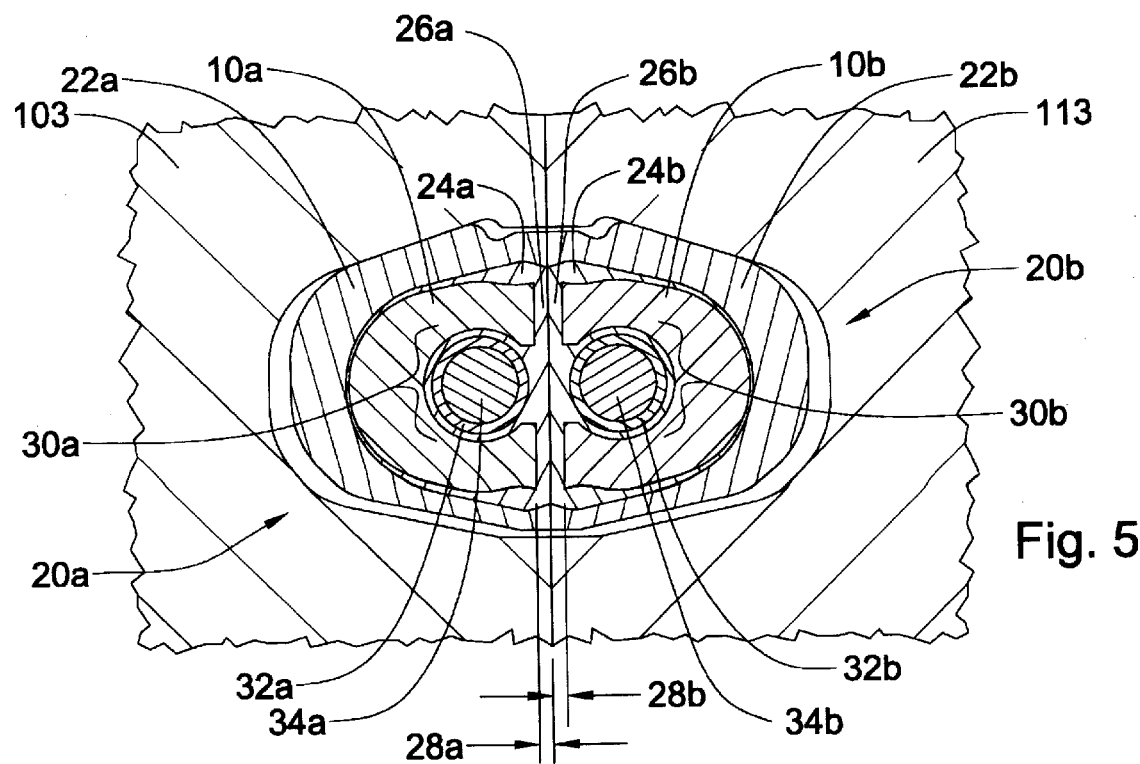
FIG. 5 is an enlarged cross sectional view of the inductive couplers as shown in FIG. 4.

FIG. 5 is an enlarged cross sectional view of the inductive couplers as shown in FIG. 4. The inductive couplers in the secondary shoulders 103 and 113 of a pin and box end joint torqued together further illustrate the arrangement of the MCEI elements with respect to the inductive coupler components. As previously mentioned, each inductive coupler 20a, 20b is essentially a mirror image of its corresponding counterpart. Sometimes this arrangement causes the face of each inductive coupler to compress. In such a scenario, if a brittle component is employed in the inductive coupler, that component could crack. If that occurs, the efficiency of the inductive coupler will likely decrease and could eventually fail with the compounding vibration effects of normal drilling. As will be discussed below, because the present invention employees a ductile material in the inductive coupler, this failure mechanism is less likely to occur.

Each inductive coupler 20a and 20b include MCEI elements comprising segments 10a and 10b respectively. As explained below in connection with FIGS. 6–9, each element is comprised of leaves 14 separated by electrically insulating material 12. In the preferred embodiment, a series of leaves, most preferably about 18 are aligned and consolidated into a segment 25. A plurality of segments 25 are then arranged to form the MCEI element with a generally circular trough.

In an alternative embodiment, the leaves and insulators are aligned and consolidated into a one-piece MCEI element, i.e. without segments.

Insulated electrical conductors 30a and 30b are disposed in a generally circular trough. It is readily seen in the drawing that the polymer 24a and 24b completely surround the elements 10a and 10b forming an electrical insulator between the annular housings 22a and 22b. A top layer 26a, 26b further insulates the element from its mirror opposite. The thickness of the top layer 28a, 28b may be determined by routine experimentation as the thickness will affect the magnetic properties of the inductive coupler. A change in magnetic and electrical properties of the inductive couplers occurs based upon the distance of gap between them. The optimal distance between the inductive couplers and thus the corresponding insulative top layer"s thicknesses will vary depending on the exact type material of which the elements are made. This optimum should be determined through routine experimentation for the magnetic and subsequent electrical performance desired for the particular inductive coupler design. In the preferred embodiment, the insulative top layer"s thickness is about 0.015" though larger or smaller thicknesses are acceptable.

When a drilling component goes deeper into a borehole, the environment typically become hotter, thus thermal expansion of materials within the inductive coupler may become problematic. The leaves, which are most preferably constructed of Mu metal, generally exhibit no such problem because of its ductility and similar thermal expansion rates to surrounding metal components. Mu-metal is a nickel-iron alloy, generally about 77% nickel, 15% iron, plus copper and molybdenum, that is very efficient for screening magnetic fields. It is used to shield vacuum chambers for experiments with low-energy electrons. At room temperature if you surround a region with mu-metal any external magnetic fields up to a thousand Oersteds (0.1 tesla) cannot penetrate the region. Mu metal's main characteristic is that it is very magnetically soft i.e. it has a small coercive field which is the field required to reverse its state of magnetisation. The name of the material refers to the Greek letter µ, which is the symbol for magnetic permeability. Mu-metal has a high value of µ or permeability.

Figure 6:
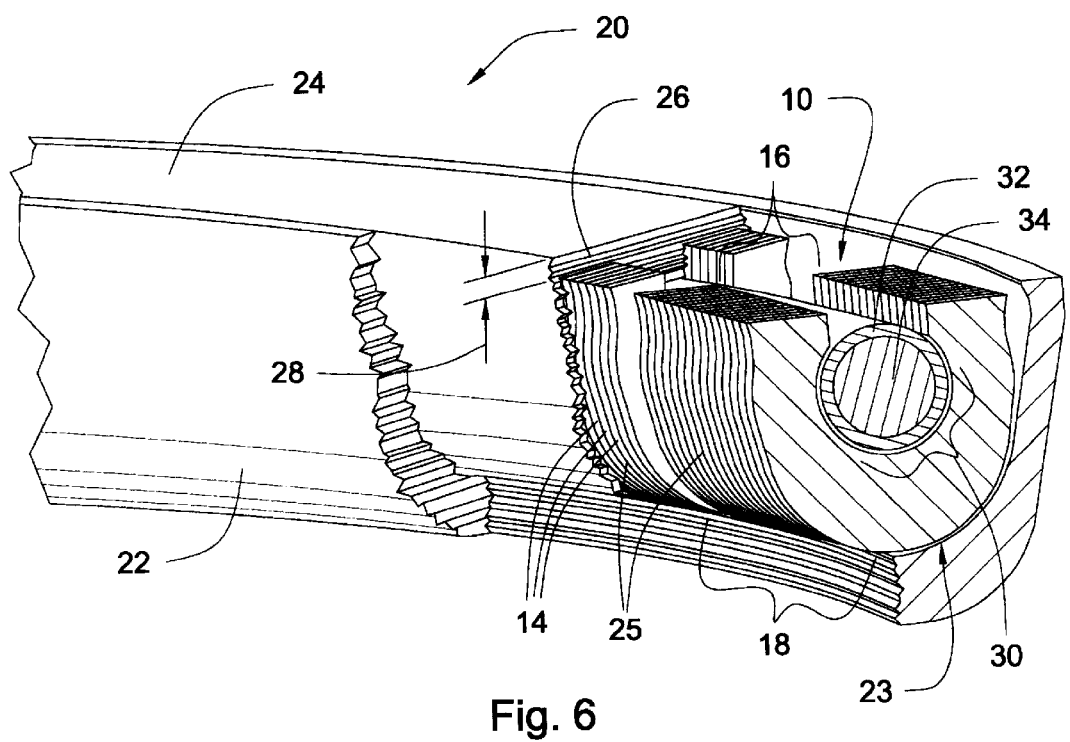
FIG. 6 is a layered cut away view of an inductive coupler.

FIG. 6 is a perspective view of a layered cross section depicting one embodiment of the invention as used in an inductive coupler 20. The segment 10 comprises an element 18 that is highly permeable. In physics and electrical engineering, permeability is the degree of magnetisation of a material in response to a magnetic field. As previously stated absolute permeability is represented by the symbol µwhich is mathmatically defined below:µ=B/Hwhere B is the magnetic flux density (also called the magnetic induction) in the material and H is the magnetic field strength.

The element 18 comprises a plurality of ductile generally U-shaped electrically conductive leaves 14. Each leaf 14 is separated from the otherwise adjacent leaves by an electrical insulating material that also serves as the bonding agent between the leaves. The electrically insulating material is not shown in this view and is generally not seen by the naked eye because of the ultra-thin layer it forms between the leaves. An insulated conductor 30 is disposed in a generally circular trough 16 formed by aligning the segments and leaves in the recess 23 of the generally annular housing 22. The insulated conductor can be a wire with an insulation layer 32 surrounding the conductive core 34 in this embodiment of the invention. Other embodiments include a twisted pair of insulated wire or a stranded core surrounded by insulation both of which are common in the art. As current flows through the insulated conductor 30, a magnetic field is created around the insulated conductor 30. The U-shaped segment 10 serves to contain the magnetic field created by the conductor 30 and prevent energy leakage into surrounding materials. The U-shape of the segment 10 also serves to transfer magnetic current to a similarly shaped segment in an adjacent inductive coupler. Typically the operating frequency range of the inductive coupler lies between 1 Hz and 10 MHz. This will largely depend on the desired inductive coupler application, such as power or information transmission along the drill string and the corresponding element material choice required by the application. Typical power transmission frequencies are in the range of 1 hz all the way to 10 Mhz with 50 khz the most preferred frequency. When determining the appropriate material for use in power transmission, generally the higher the freuquency used to transmit power means a lower permeability material chosen and the lower the frequency used to transmit power corresponds to a higher permeability material needed. For example, when using a very high permeability material such as Supermalloy with an initial permability of around 75,000, the corresponding chosen frequency used to transmit power may be generally around 50 hz or lower.

Referring to FIG. 6, an MCEI element 25 comprising a plurality of segments 10 is disposed in a recess 23 defined by generally annular housing 22. Another feature of the invention is that the segments 10 are electrically insulated from each other and the annular housing 22 because the segments are also electrically conductive in addition to magnetically conductive. If the segments weren''t insulated from their surroundings, they could short out against each other and possibly weaken the ability of the inductive coupler to transmit information. The insulating material covers the top of the MCEI element 25 including segments 10 so that an opposing inductive coupler will not come in electrical contact with and short out the MCEI element. To this end, a polymer 24 affixes the segments 10 within the annular housing 22 and fills gaps between otherwise adjacent segments, the housing and the insulated conductor, and further fills the circular trough 16. The polymer also serves to electrically insulate the elements from the annular housing. A top insulative layer 26 is thus formed above the plurality of segments that comprises the MCEI element 25. The chosen thickness 28 of the top insulative layer is best selected by routine experimentation. The polymer 24 also affixes the insulated conductor 30 along the trough 16 formed by aligning the segments 10 and leaves 14. Additionally the polymer serves to prevent the transfer of strain or shock to the segments which can also have adverse effects.

Various types of polymers can be employed as the "filler material" for the inductive coupler such as polyether ether ketone or PEEK and polyether ketone ketone or PEKK. A thermoplastic material is desirable for its processability characteristics as well as a fluoropolymer type material for its unreactivity to many chemicals. Teflon® is one such type of thermoplastic fluoropolymer. Various grades of Teflon® are available such as perfluoroalkoxy copolymer or PFA, fluorinated ethylene propylene or FEP, ethylenetetrafluoroethylene or ETFE, amorphous fluoropolymer or AF, polytetrafluoroethylene or PTFE, and ethylenechlorotrifluoroethylene copolymer or ECTFE. ECTFE is also known as Halar. These materials also have desirable mechanical and electrical properties excellent for use within the inductive coupler. Teflon® is well known as a dielectric which is often used in the production of coaxial cables. Some other thermoplastic choices are nylons, polyethylene, polypropylene, polystyrene and copolymers of the same. Other polymer material choices fall under the class of thermosets. Some examples of thermosets are silicones, epoxies, and polyurethanesThese same materials can form the electrically insulating material that can be bonded to the conductor of the insulated electrical conductor disposed in the trough in the MCEI element. The preferred insulating material and polymer filler is PFA and FEP respectively, with PFA grade 340 and FEP grade 6100 the most preferable. The respective melting point of PFA and FEP, with PFA higher than FEP, allows for feasible processability of the inductive coupler. The PFA is bonded or coated onto the conductor, forming the insulated conductor, prior to assembly of the inductive coupler. When the annular housing, insulated conductor, and MCEI element are assembled and filled with FEP, the temperature necessary for the processing of the FEP will not spoil the integrity of the PFA on the conductor, thus ensuring proper insulation. This principle can be used with other thermoplastics besides just PFA and FEP as long as the insulating material melting temperature is sufficiently higher than the filler polymer melting temperature.

In the preferred embodiment of the invention, an element is used in an inductive coupler in a downhole component. The element comprises a plurality of ductile, generally U-shaped electrically conductive leaves with each leaf separated from the otherwise adjacent leaves by electrically insulating material.

Figure 7:
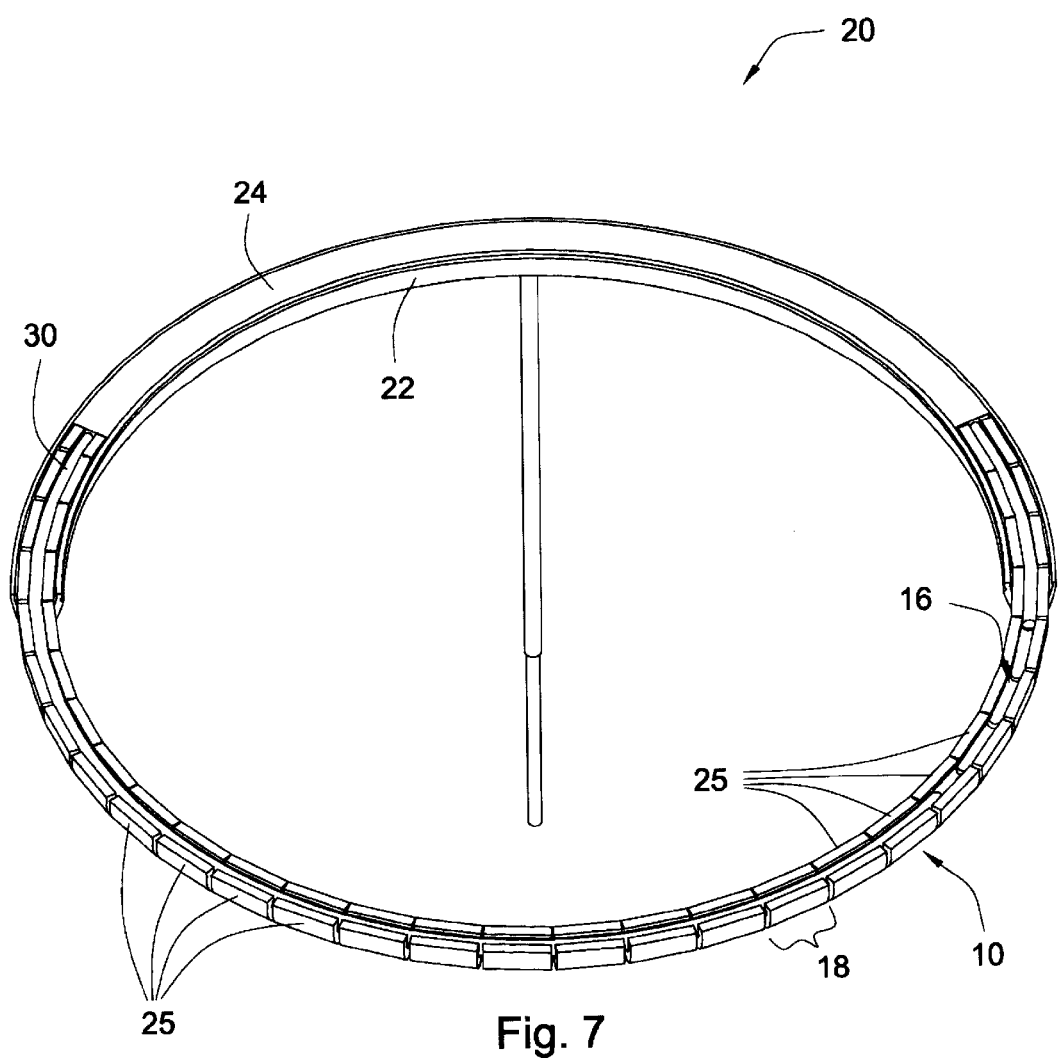
FIG. 7 is a layered cut away view of the MCEI element in an inductive coupler.

Referring to the drawings, FIG. 7 is a layered cut away view of the MCEI element in an inductive coupler. An inductive coupler 20 is formed with an MCEI element 25, annular housing 22, and insulated conductor 30 which are conslidated using a polymer 24. The MCEI element 25 comprises a plurality of segments 10 with each segment comprising an element 18 as discussed in greater detail below. The segments 10 are aligned to form a generally circular trough 16. The insulated conductor 30 is partially cut away and removed in this drawing to clearly show the trough 16 whereas it is normally disposed all the way around and in the trough.

Figure 8:
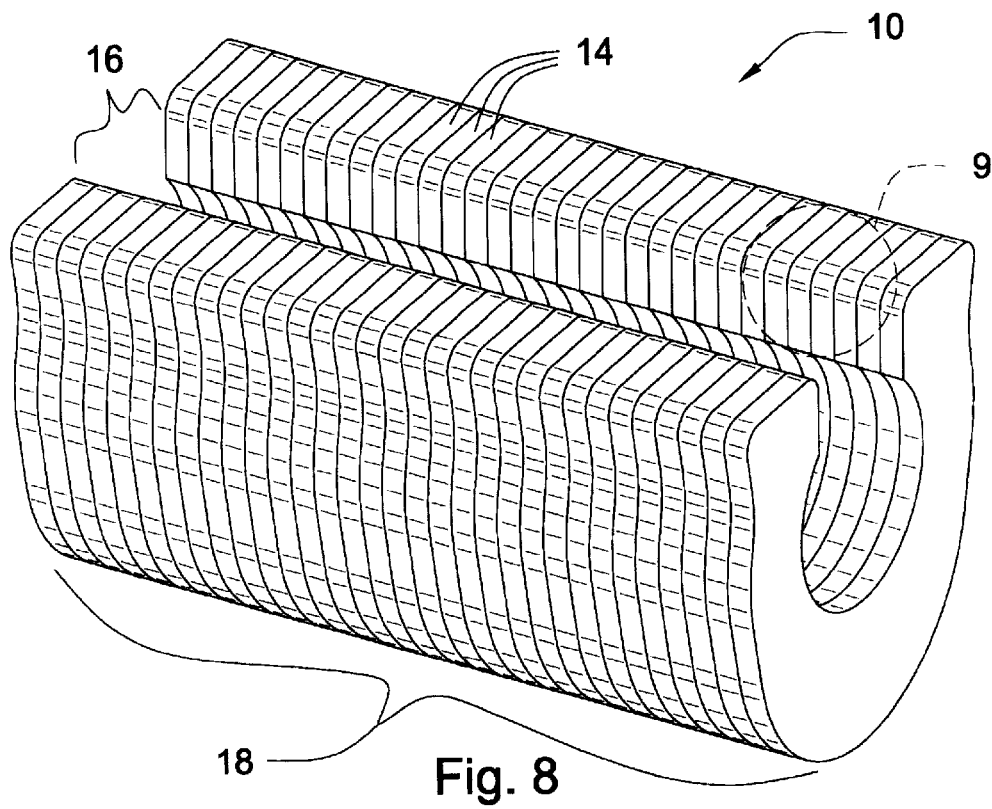
FIG. 8 is a perspective view of the element for use in an inductive coupler.

Referring to the drawings, FIG. 8 is a perspective view of the element for use in an inductive coupler. In one embodiment of the invention, the general shape of the element 18 is a segment 10. The element constitutes a plurality of ductile generally U-shaped electrically conductive leaves 14. The lamination of the generally U-shaped leaves into a cohesive structure form a trough 16 suited to dispose an insulated electrical conductor therein. The length or diameter of the element is subject to its particular application and is flexible to fit the needs of its application. The element is not limited to a segment shape. In another embodiment of the invention the element is generally shaped in a ring with the leaves arranged to form a generally circular trough. The ring can either be closed i.e. a complete ring or it can be partially open with a gap in between two ends of the ring.

Figure 9:
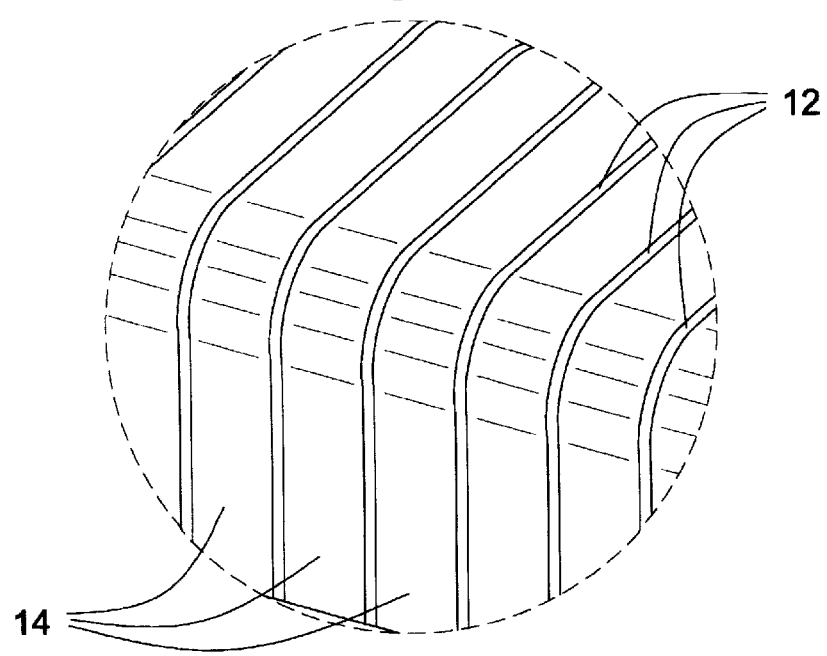
FIG. 9 is an enlarged partial view taken from FIG. 8.

FIG. 9 is an enlarged partial view taken from FIG. 8. Because of the thin layers involved, this view would generally not be seen to the naked eye. But to give clarity and understanding, a close up of the features that form the element are necessary. The close up reveals the alternating electrically insulating material 12 in-between ductile, generally U-shaped leaves 14. Preferably, the electrically insulating material also serves to bond the U-shaped leaves together. Various polymers can be used for the dual purpose of bonding the U-shaped leaves together as well as electrically insulating the leaves from each other. Some preferred polymers are the various classes of silicones, epoxies, and polyurethanes. The most preferred electrically insulating material though is epoxies. Of course polymer selection can largely depend on temperature conditions the element will experience in operation. Thus many possible polymer choices are within the scope of the invention. The preferred electrical insulator thickness is less than about 0.0005". It should be understood that the term "thickness" designates an average distance between any two adjacent leaves in the element. The resultant volume between leaves is taken up by the electrically insulating material. The preferred number of leaves used to make the element is a segment of 18, though as previously stated the element may also be a continuous ring. It is preferable that all the leaves have electrically insulating material between them, however should the insulating material break down or be missing between some of the leaves, the element will still be viable when adapted to operate in an inductive coupler. It is possible that even one or more segments could be rendered inoperable if the electrically insulating material between the leaves is missing or degraded. However, even in such instances the inductive coupler using some inoperable segments as part of the MCEI element will still function.

Some important geometrical considerations may be addressed which affect the magnetic and electrical characteristics of the element. One dimension that exhibits an effect on these related properties is the thickness of each generally U-shaped leaf. Thus, the optimal thickness may be selected by routine experimentation taking into account all physical, electrical, and magnetic properties desired in the final product. In one embodiment of the invention the generally U-shaped leaves are less than about 0.0625" thick. In another embodiment of the invention the U-shaped leaves are less than about 0.030" thick and the most preferred segment thickness is about 0.014". The minimum thickness is about 0.003".

There are three types of magnetic material: soft magnetic materials, semi-hard magnetic materials, and hard magnetic materials. The designations soft, semi-hard, and hard have to do with the natural magnetic state of the material. Hard magnetic materials are those most commonly known as they represent the group of metals that are considered permanent magnets i.e. they do not require an external magnetic field for their magnetic properties to be exhibited. Soft magnetic materials however do not exhibit ferromagnetism unless a magnetic field is applied, such as the naturally occurring magnetic field surrounding a wire with A.C. current flowing through it. The term semi-hard is used for those materials that fall somewhere between the two ends of the spectrum, soft and hard magnetic materials. Because the present invention is a element, it falls under the soft and semi-hard magnetic materials designation. Typically these materials constitute alloys from the following group of elements: Ni, Fe, Cu, Mo, Co, Cr, V, C, and Si. Of course when discussing the composition of these type of soft and semi hard magnetic alloys, they are referred to by their nominal compositions and not their actual included impurities found in relatively small amounts during casting.

Another property to consider when making the element is the relative magnetic permeability, both initial and maximum values. The magnetic permeability of a material is defined as the ratio of the magnetic flux density B established within a material divided by the magnetic field strength H of the magnetizing field. It is usually expressed as a dimensionless quantity relative to that of air (or a vacuum). Because the invention focuses on highly permeable materials, the initial permeability values are preferably in the range of 650 such as that found in Hiperco, an iron-cobalt alloy, to 75,000 as exhibited in some Supermalloy materials. The maximum relative permeability range is preferably from around 2000 (as found in Isoperm an equal nominal composition of nickel and iron) to around 800,000 as exhibited again in Supermalloy, generally about an 80% Ni/Fe/Mo composition. Supermalloy is an 80% nickel-iron alloy processed for exceptionally high initial permeability. Applications include very low level signal transformers, low level magnetic preamplifiers, high value inductors which have no superimposed direct currents and precision current transformers. Initial and maximum permeabilites are usually shown in a B-H magnetization curve where the magnetic induction B is measured and plotted versus a corresponding applied magnetic field H. The initial permeability is the limiting value approached by normal permeability when H is reduced toward zero, i.e. the slope of the magnetization curve at the initial magnitic field application. The maximum permeability is the largest value of normal permability obtained from a B-H curve, i.e. where the slope of the magnetization curve is steepest.

For comparison purposes, a typical drill pipe alloy, 4140 alloy steel has a magnetic permeability of about 42 and a typical Ni—Zn ferrite has an initial permeability of 82. It is preferable to close the magnetic path that couples the adjacent coils with a material having a magnetic permeability higher than that of steel. Because the present invention employs electrically conductive material, it is also important that the elements are electrically insulated from their surroundings. Other important physical characteristics to consider when choosing the element material are brittleness and toughness or ductility, Curie temperature, and overall processability.

Because of the harsh environments associated with downhole drilling, it is desirable to employ inductive couplers that are robust and tough, especially in the key components of an inductive coupler such as the magnetic material. Preferably the material chosen out of which to make the element is a ductile material. One method to measure ductility of a material is percent elongation. For example, one preferred material out of which to make the element is Moly Permalloy alloy, a soft magnetic alloy manufactured by Allegheny-Ludlum that exhibits a 32% elongation in 2", a good indicator of ductility. This result can be found at Allegheny Ludlum''s home page in the technical data sheet for Moly Permalloy Nickel Alloys (HTA) and conforms to the ASTM A-753 and MIL N-14411 specifications.

In selecting the optimum material for a specific application, another item to consider is the Curie temperature of a material. The Curie temperature may be problematic because the invention may undergo temperature extremes during drilling. For example, exploration drilling may be done in cold environments such as the North Sea where outside temperatures can be well below 0° C. and up to 200° C. at the bottom of a borehole. Generally, as a ferromagnetic material is heated to a high temperature it looses its ferromagnetic properties, something that is detrimental to the performance of the current invention. Basically if the temperature of the magnetic material is raised above a critical temperature, designated as the Curie temperature, the thermal motion of the atoms is so violent that the electrons in the bonds are no longer able to keep the dipole moments aligned and the ferromagnetic properties are lost. For example, Mu metal Curie temperatures are typically found in the range of 450° C. to 500° C. whereas ferrite Curie temperature may be in the range of 120° C. to 260° C. The preferred materials used for the element exhibit high temperature robustness.

A preferable type of material is a mu metal alloy with HyMu "80"® alloy the most preferable. A preferred supplier of HyMu "80"® is Carpenter Technology Corporation, Wyomissing, Pa. A preferred manufacturer to assemble the generally U-shaped electrically conductive leaves of the element is Electro Magnetic Products, Inc., Morristown, N.J. Other possible material choices are Supermalloy available from Magnetics®, a Division of Spang and Company, East Butler, Pa. Another alternative material is Metglas® and its various grades available from Metglas Inc., Morristown, N.J. Of course other materials can be used that exhibit similar magnetic and physical properties as those described above.

Many types of data sources are important to management of a drilling operation. These include parameters such as hole temperature and pressure, salinity and pH of the drilling mud, magnetic declination and horizontal declination of the bottom-hole assembly, seismic look-ahead information about the surrounding formation, electrical resistivity of the formation, pore pressure of the formation, gamma ray characterization of the formation, and so forth. The high data rate provided by the present invention provides the opportunity for better use of this type of data and for the development of gathering and use of other types of data not presently available.

Whereas the present invention has been described in particular relation to the drawings attached hereto, it should be understood that other and further modifications apart from those shown or suggested herein, may be made within the scope and spirit of the present invention.

It is therefore intended that the foregoing detailed description be regarded as illustrative rather than limiting, and that it be understood that it is the following claims, including all equivalents, that are intended to define the spirit and scope of this invention.

What is claimed is:

1. An element for use in an inductive coupler in a downhole tool, comprising: a plurality of ductile, generally U-shaped electrically conductive leaves, each leaf separated from the otherwise adjacent leaves by electrically insulating material, wherein said leaves are less than about 0.0625" thick and said leaves are aligned to form a generally circular trough, and an insulated continuous generally circular electrical conductor is disposed within the generally circular trough.

2. The element of claim 1 wherein the initial relative magnetic permeability of the plurality of ductile, generally U-shaped electrically conductive leaves is between about 650 and about 5,000.

3. The element of claim 1 wherein the maximum relative magnetic permeability of the plurality of ductile, generally U-shaped electrically conductive leaves is between about 2000 and about 800,000.

4. The element of claim 1 wherein the generally U-shaped electrically conductive leaves are less than about 0.030" thick.

5. The element of claim 1 wherein the generally U-shaped electrically conductive leaves are about 0.014" thick.

6. The element of claim 1 wherein the conductive leaves comprise a material selected from the group consisting of soft magnetic alloys and semi-hard magnetic alloys.

7. The element of claim 1 wherein the conductive leaves comprise a material selected from the group consisting of Ni, Fe, Cu, Mo, Co, Cr, V, C, Si, as well as alloys and combinations thereof.

8. The element of claim 1 wherein the conductive leaves comprise a mu metal material.

9. The element of claim 1 wherein the conductive leaves comprise a supermalloy material.

10. The element of claim 1 wherein the electrically insulating material is less than 0.0005" thick.

11. The element of claim 1 wherein the electrically insulating material is selected from the group consisting of epoxies, silicones, polyurethanes and combinations thereof.

* * * * *